June 23, 1942.    N. J. POUX    2,287,323
FASTENER
Filed Dec. 29, 1937
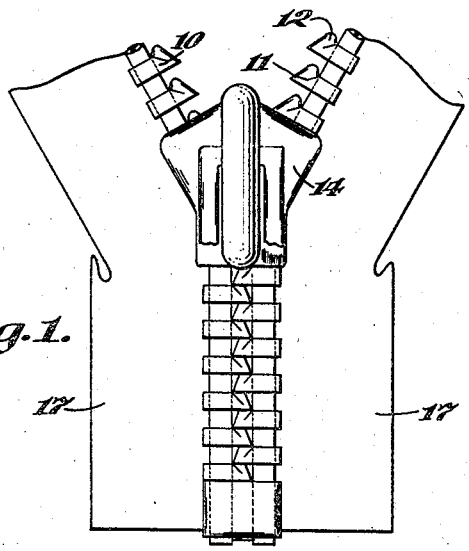
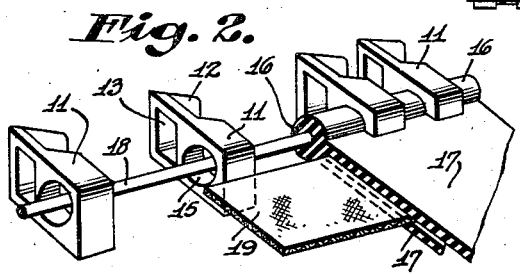
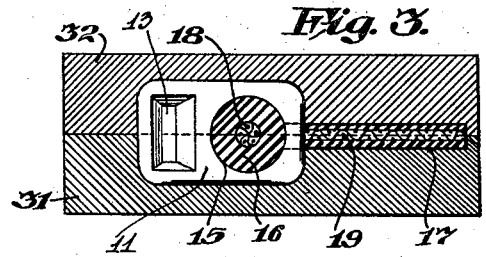
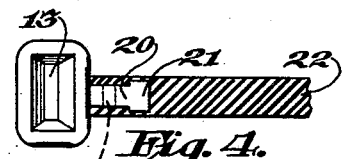
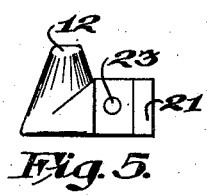
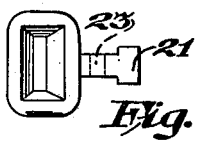
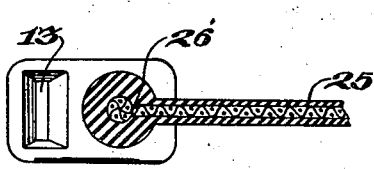
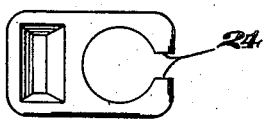
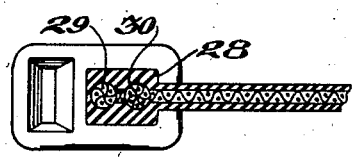
INVENTOR.
Noel J. Poux
BY Kelly & Chisholm
ATTORNEYS.

Patented June 23, 1942

2,287,323

UNITED STATES PATENT OFFICE 2,287,323

FASTENER

Noel J. Poux, Meadville, Pa., assignor to Talon, Inc., a corporation of Pennsylvania Application December 29, 1937, Serial No. 182,292

7 Claims. (Cl. 24—205)

My invention relates to flexible fasteners and methods of making the same. More particularly my invention provides a new fastener construction and the manufacture of such fasteners which are commonly called "zippers."

In the manufacture of slide fasteners, it is customary to make the slide fastener members with spread apart jaws and then bend them around the edge of a beaded fabric stringer in the case of metal elements, or stick them in position by solvent, in the case of soluble plastic material. Another method which is used to some extent is to die-case the slide fastener members on the beaded edge of a fabric stringer.

My invention is diametrically opposed to this practice in that I propose to manufacture the fastener elements with the most efficient shapes and then mold the stringer in the fastener elements. The advantages resulting from the invention will be apparent, to those skilled in the art. A great deal of difficulty is experienced in manufacturing stringers with sufficiently accurate beads and then further difficulty is experienced in placing the fastener members accurately in position upon them and in keeping the dimensions of the stringer constant during such attachment. Furthermore, in the applying of the fastener elements to the beaded edge of stringers, it is difficult to keep the accurate shapes of the fastener members.

In my invention, however, the fastener members can be made accurately and the stringer molded into position will not vary in length or thickness.

In the accompanying drawing, I have shown for purposes of illustration a preferred embodiment and a few of the simpler modifications thereof. In the drawing;

Fig. 1 is a face view of a slide fastener constructed in accordance with my invention;

Fig. 2 is a fragmentary enlarged exploded view, partly in section, of the slide fastener shown in Fig. 1;

Fig. 3 is a cross-section showing the method of molding the stringer in position;

Fig. 4 is a cross-section showing a modified construction;

Figs. 5 and 6 are side and top views respectively of the slide fastener member shown in Fig. 4;

Fig. 7 is a cross-section showing a further modification;

Fig. 8 is a top view of the fastener member of Fig. 7; and

Fig. 9 is a cross-section showing a still further modification.

The particular form of slide fastener is not important and the one shown comprises fastener members 10, 11 having heads or head portions with the usual projections and sockets 12 and 13 respectively, which interengage and hold the fastener together. A slider 14 moves over the fastener members in opening and closing the same. Each of the fastener elements as shown in Figs. 2 and 3 has a round hole 15 in its stringer engaging portion.

The stringer herein instead of the usual flexible fabric member is a molded stringer in which there is a round beaded portion 16 and an integral flat portion 17 extending therefrom to provide means for attachment to the side of an opening in an article in which the fastener is used. The stringer preferably consists of molded rubber and is sufficiently flexible to accommodate the necessary movements of the fastener elements when the slider is moved, and also to provide for transverse flexibility of the fastener. Preferably there is a thread or cord reinforcement 18 in the beaded portion 16 and a fabric reinforcement 19 in the flat portion 17 of the stringer. When there is no opening in the end of the fastener member as in Figs. 2 and 3 these reinforcements would not extend into the beaded portion but ordinarily there will be sufficient strength in the rubber between the cord reinforcement 18 and fabric reinforcement 19.

In Fig. 4 the stringer engaging portion consists of a single arm 20 preferably having shoulders 21 to provide interengaging means with the rubber stringer member 22, and it may also have a hole 23 to provide the space in which the molded rubber may flow.

In Figs. 7 and 8 the fastener member is the same as in Figs. 2 and 3 with the exception that the beaded edge receiving hole opens through the end at 24 and the reinforcement 25 extends into and connects with the bead reinforcement 26, as shown in Fig. 7. In this modification the legs of the fastener elements are never any further apart than shown in Fig. 8.

In Fig. 9 the construction is approximately the same with the exception that a square opening 28 is provided in each fastener member and there are two beaded reinforcements 29, 30 extending longitudinally of the bead.

The method of manufacture of the fastener of Figs. 1, 2 and 3 will now be readily understood. First a series of fastener members 11 is placed in one of the mold parts 31 in properly spaced and aligned relation, with the cord reinforcement 18 extending through the hole 15 thereof and also with the fabric reinforcement 19 positioned in the mold, as shown in Fig. 3. Then the rubber is placed in position and the other mold part 32 closed against the mold part 31, whereupon the rubber stringer is compressed and vulcanized in proper position. If desirous the moldable material may be injected into the molds after they are closed. With the rubber stringer elements molded in position as shown the operation of the fastener is substantially the same as the present day fasteners except that it is believed it will be smoother because of greater accuracy of the fastener parts. The slider 14, however, rides directly on the shoulders of the fastener members. This does not have any bearing on any portion of the molded rubber element which would result in an undue amount of friction and wear.

While I have shown and described in this application one embodiment and several modifications thereof which my invention may assume in practice, it will be understood that this embodiment and the modifications are merely for the purposes of illustration and description, and that various other forms may be devised within the scope of my invention as defined in the appended claims.

What I claim as my invention is:

1. In a flexible fastener of the class described, cooperating series of substantially rigid fastener elements, each element being integral and having a head portion and a stringer engaging portion with a bead-receiving opening having continuous walls, a longitudinally inextensible stringer of reinforced homogeneous resilient flexible material having a thickened bead portion disposed in the bead-receiving openings of the fastener elements and bonded to said fastener elements, said stringer having a flat portion extending from said thickened bead portion and integral therewith for attachment at the side of an opening.

2. A flexible fastener of the class described, comprising a series of substantially rigid fastener elements, each being integral and having a hole with continuous side walls, and a flexible substantially inextensible stringer having an integral beaded edge portion extending through said holes and having a flat portion integral with said beaded edge portion and extending in an opposite direction from the fastener elements and constituting means for attachment at the side of an opening.

3. A flexible fastener of the class described, comprising cooperating series of substantially rigid fastener members, each being integral and each having an opening with closed side walls to receive the bead of a stringer, and a flexible substantially inextensible stringer of resilient material having a bead extending through said openings, and having an integral flat laterally extending portion constituting means for attachment at one side of an opening.

4. A flexible fastener as described in claim 3, wherein said stringer is an integral substantially inextensible fabric and rubber element bonded to said fastener members.

5. A flexible fastener as described in claim 3, wherein each stringer is a rubber element incorporating substantially inextensible fabric reinforcing means in the flat portion, and cord reinforcing means extending longitudinally through the bead.

6. A flexible fastener as described in claim 3, wherein each stringer is a rubber element having substantially inextensible reinforcing means extending longitudinally through the bead and other reinforcing means embedded in the flat portion of the stringer.

7. A flexible fastener as described in claim 3, wherein the stringer is an integral rubber element in which there is a single substantially inextensible reinforcing tape extending longitudinally through the flat portion of the stringer and a substantially inextensible bead reinforcement extending through the bead of the stringer.

NOEL J. POUX.